United States Patent
Kim et al.

(10) Patent No.: US 10,227,954 B2
(45) Date of Patent: Mar. 12, 2019

(54) CANISTER VALVE DEVICE FOR VEHICLE

(71) Applicant: Hyundai Motor Company, Seoul (KR)

(72) Inventors: Chang Han Kim, Gwangju (KR); Jae Hwa Park, Suwon-si (KR); Jung Su Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 175 days.

(21) Appl. No.: 15/363,269

(22) Filed: Nov. 29, 2016

(65) Prior Publication Data

US 2018/0030933 A1    Feb. 1, 2018

(30) Foreign Application Priority Data

Jul. 26, 2016   (KR) .................. 10-2016-0094864

(51) Int. Cl.

| | | |
|---|---|---|
| *F16K 31/02* | (2006.01) | |
| *F02M 25/08* | (2006.01) | |
| *F16K 1/12* | (2006.01) | |
| *F16K 15/02* | (2006.01) | |
| *F16K 15/18* | (2006.01) | |
| *F16K 31/06* | (2006.01) | |
| *F16K 15/14* | (2006.01) | |

(52) U.S. Cl.
CPC ........... *F02M 25/0836* (2013.01); *F16K 1/12* (2013.01); *F16K 15/026* (2013.01); *F16K 15/148* (2013.01); *F16K 15/18* (2013.01); *F16K 15/186* (2013.01); *F16K 31/0655* (2013.01)

(58) Field of Classification Search
CPC ........ F02M 25/0836; F02M 2025/0845; F16K 31/0655
See application file for complete search history.

(56) References Cited

U.S. PATENT DOCUMENTS

| | | | |
|---|---|---|---|
| 5,605,177 A * | 2/1997 | Ohashi ............. | B60K 15/03519 123/516 |
| 9,902,258 B2 * | 2/2018 | Young .............. | B60K 15/03519 |
| 2002/0078932 A1 * | 6/2002 | Weldon ............. | F02M 25/0836 123/520 |
| 2003/0051541 A1 * | 3/2003 | Kano ................ | F02M 25/0818 73/114.41 |

(Continued)

FOREIGN PATENT DOCUMENTS

| | | |
|---|---|---|
| JP | 11-193756 A | 7/1999 |
| JP | 2011-021505 | 2/2011 |

(Continued)

*Primary Examiner* — Reinaldo Sanchez-Medina
(74) *Attorney, Agent, or Firm* — Morgan, Lewis & Bockius LLP (57) ABSTRACT

A canister valve device for a vehicle that is equipped with a shutoff valve device connected to a pipe providing a passage for air to flow to a canister and selectively opening and closing the passage of the pipe, may include a diverging channel diverging from the passage of the pipe to a position where the shutoff valve device is positioned to provide a passage for a portion of air flowing to the pipe; and a check valve device positioned in the diverging channel, closing when the shutoff valve device closes, and opening when the shutoff valve device opens so that air is distributed to the pipe and the diverging channel, whereby negative pressure applied to the shutoff valve device is configured to be reduced by flow of the air.

10 Claims, 9 Drawing Sheets

(56) References Cited

U.S. PATENT DOCUMENTS

| | | | |
|---|---|---|---|
| 2006/0185735 A1* | 8/2006 | Tsuge | F02M 25/0836 137/495 |
| 2007/0227512 A1* | 10/2007 | Steinman | F02M 25/0836 123/519 |
| 2010/0269921 A1* | 10/2010 | Pifer | B60K 15/03519 137/487.5 |
| 2011/0240145 A1* | 10/2011 | Pifer | F16K 17/0413 137/487.5 |
| 2016/0369722 A1* | 12/2016 | Wakamatsu | F02D 41/0032 |

FOREIGN PATENT DOCUMENTS

| | | |
|---|---|---|
| KR | 10-2005-0108562 | 11/2005 |
| KR | 10-2007-0025711 | 3/2007 |
| KR | 10-2007-0108656 | 11/2007 |
| KR | 10-2008-0048770 A | 6/2008 |
| KR | 10-2012-0062162 | 6/2012 |
| KR | 10-1262391 B1 | 5/2013 |
| KR | 10-1361357 B1 | 2/2014 |
| KR | 10-2017-0050324 | 5/2017 |

* cited by examiner

CANISTER VALVE DEVICE FOR VEHICLE

CROSS REFERENCE TO RELATED APPLICATION

The present application claims priority to Korean Patent Application No. 10-2016-0094864, filed Jul. 26, 2016, the entire contents of which is incorporated herein for all purposes by this reference.

BACKGROUND OF THE INVENTION

Field of the Invention

The present invention relates to a canister valve device for a vehicle and, more particularly, to a canister valve device for a vehicle that has improved opening performance.

Description of Related Art

In general, exhaust gas from a vehicle can be classified into exhaust gas that is discharged through an exhaust system after a gas mixture of fuel and air is burned in a cylinder, evaporative gas produced by the evaporation of fuel in a fuel tank, and blow-by gas that is a gas mixture that is not burned in a combustion chamber but is discharged to a crankcase.

In particular, adsorption filtration using a charcoal (activated carbon) canister is used at present to control the evaporative gas.

That is, evaporative gas from a fuel tank (or a carburetor) is absorbed and kept in a charcoal canister when an engine is not operating, and when the engine is started and reaches a predetermined operating condition, an ECU opens a control valve so that the evaporative gas in the canister is guided to an intake system together with external air by negative intake pressure.

This control valve is operated particularly by an electromagnet, but it is influenced by negative intake pressure, so the opening/closing performance is deteriorated. For example, when negative pressure is applied in the closing direction of the valve, the valve becomes tightly shut, so noise is reduced and airtightness is improved. However, when the valve is operated in the opening direction, the opening performance is reduced by the negative pressure.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a canister valve device for a vehicle that ensures airtightness performance and noise reduction performance, and ensures opening performance as well in consideration of the direction of negative pressure that is applied to the valve.

In various aspects of the present invention, a canister valve device for a vehicle is equipped with a shutoff valve device connected to a pipe providing a passage for air to flow to a canister and selectively opening and closing the passage of the pipe, the canister valve device including: a diverging channel, diverging from the passage of the pipe to a position where the shutoff valve device is positioned to provide a passage for some of the air flowing to the pipe; and a check valve device, positioned in the diverging channel, closing when the shutoff valve device closes, and opening when the shutoff valve device opens so that air is distributed to the pipe and the diverging channel, whereby the negative pressure applied to the shutoff valve device is reduced by the flow of air.

The pipe may include: a first inlet port through which air flows inside; and a second inlet port extending from the first inlet port so that the air flowing inside through the first inlet port flows to the canister, and the diverging channel may diverge along another path from the first inlet port and extends to the second inlet port.

The second inlet port may be disposed lower than the first inlet port in an airflow direction.

A first nipple may be formed at the first inlet port, a second nipple may be formed at the second inlet port, and the two respective ends of the diverging channel may be connected to the first nipple and the second nipple.

The diverging channel may be divided into a first hose connected to the first nipple and a second hose connected to the second nipple, and the first hose and the second hose may be connected to each other through the check valve device.

The shutoff valve device may be an electromagnetic solenoid valve that is operated to close the pipe when power is applied, and may be operated to open the pipe when power is not applied.

The shutoff valve device may include: a body coupled to the pipe; a plunger vertically moved by an electromagnet in the body; and a shutoff valve coupled to an end of the plunger through an elastic spring and closing the passage of the pipe when the plunger is moved.

The check valve device may include: a housing positioned in the diverging channel and having an air hole for airflow; a check valve positioned in the housing and moved by airflow to close the air hole; and a return spring positioned in the housing, connected to the check valve, and returning the check valve that has been moved to an initial position thereof.

The canister valve device may further include an air control valve device selectively allowing airflow ahead of the shutoff valve device in the pipe The air control valve device may include: a body coupled to the pipe and having a coupling hole in a center thereof and a plurality of airflow holes around the coupling hole; and a control valve having a coupling shaft inserted and fixed in the coupling hole in the body and a flange extending around the coupling shaft and covering the airflow holes.

The control valve may include a flexible material to be variable in shape by airflow.

The flange of the control valve may be rounded toward the body around the coupling shaft.

According to the canister valve device for a vehicle that has the structure described above, the valve-closing direction of a shutoff valve device is the same as the direction in which negative pressure created by airflow is applied, whereby airtightness performance and noise reduction performance are ensured and negative pressure applied to the valve is reduced by distributing the negative pressure when the valve opens, so the opening performance of the valve is improved.

The methods and apparatuses of the present invention have other features and advantages which will be apparent from or are set forth in more detail in the accompanying drawings, which are incorporated herein, and the following

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims Hereinafter, canister valve devices according to exemplary embodiments of the present invention are described with reference to the accompanying drawings.

Figure 1:
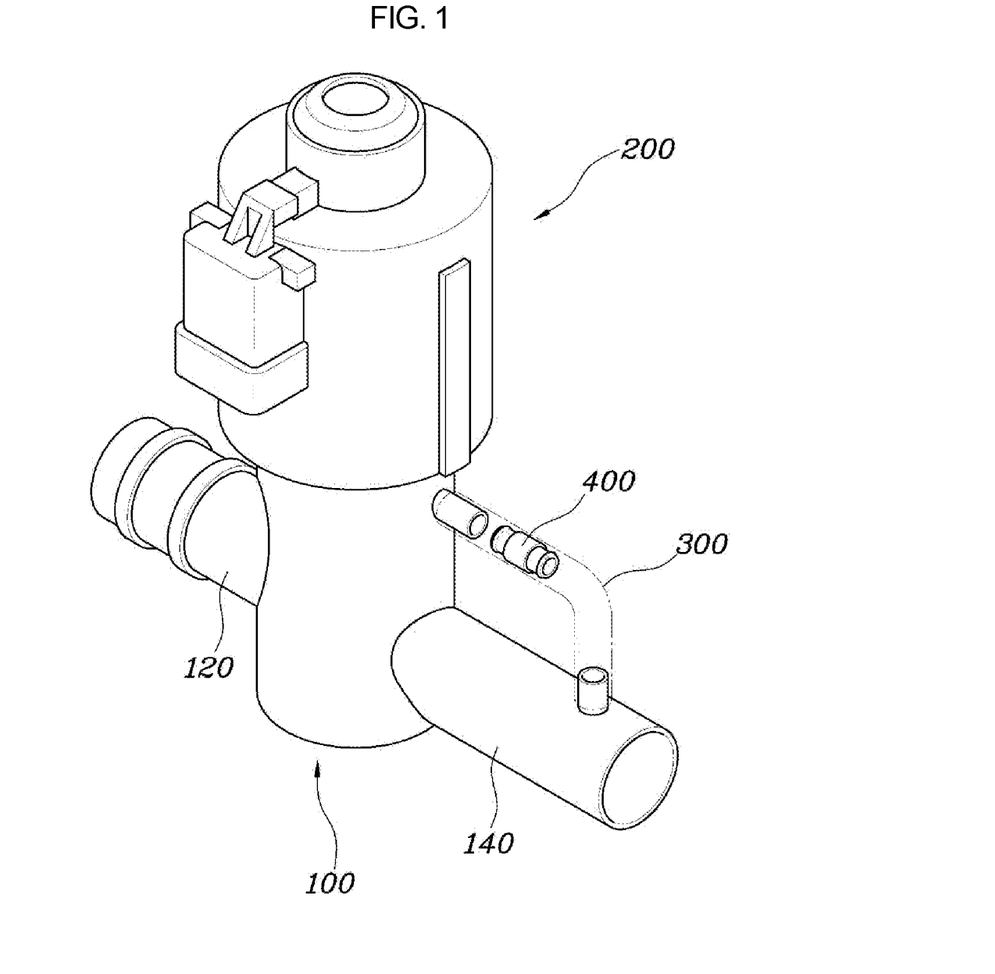
FIG. 1 is a view showing a canister valve device for a vehicle according to various exemplary embodiments of the present invention.
Figure 2:
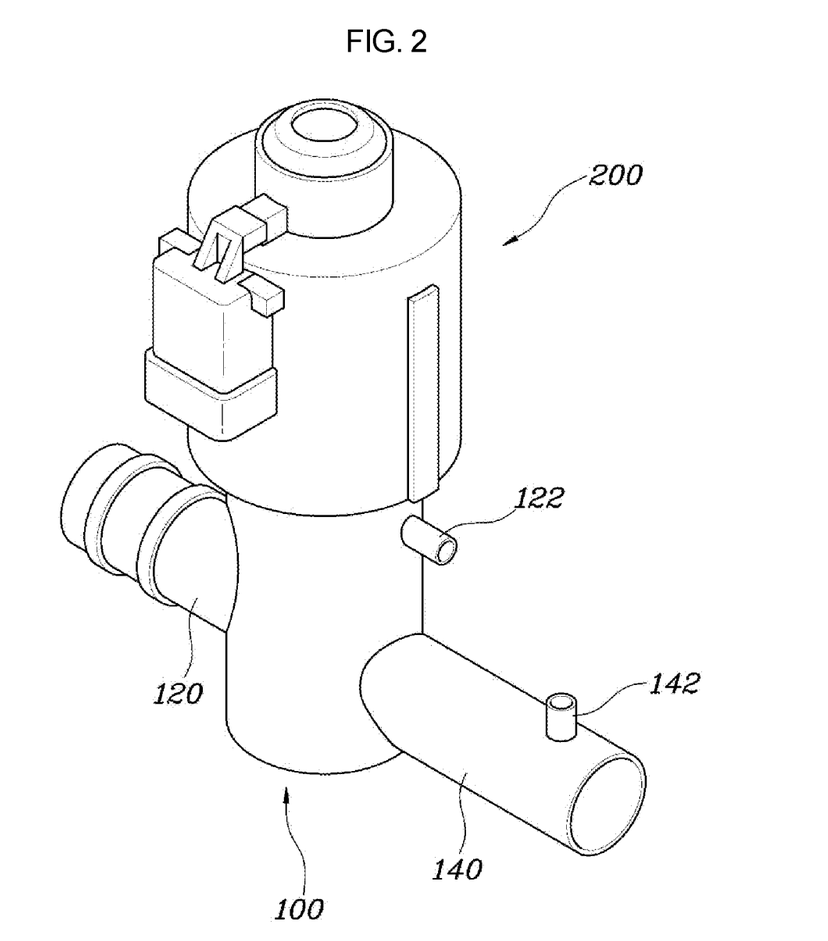
FIG. 2, FIG. 3, and FIG. 4 are views illustrating the canister valve device for a vehicle according to the various exemplary embodiments shown in FIG. 1.
Figure 3:
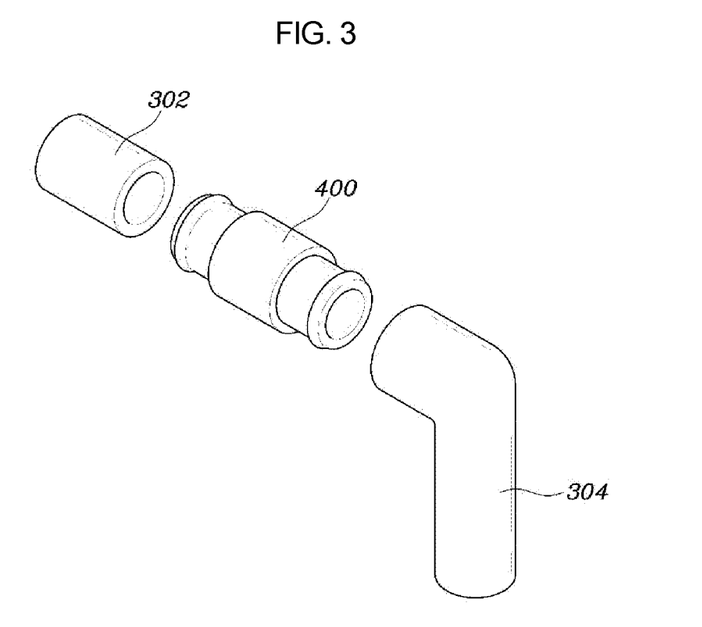
Figure 4:
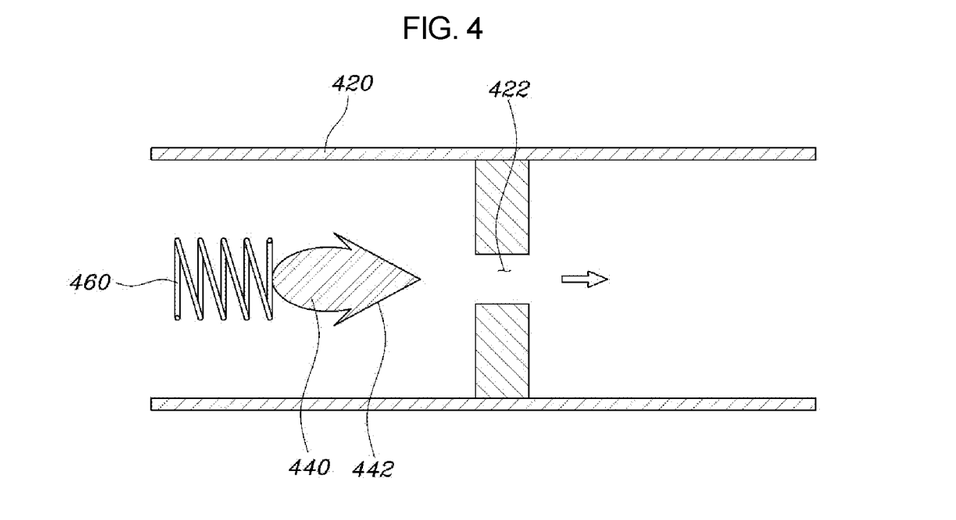
Figure 5:
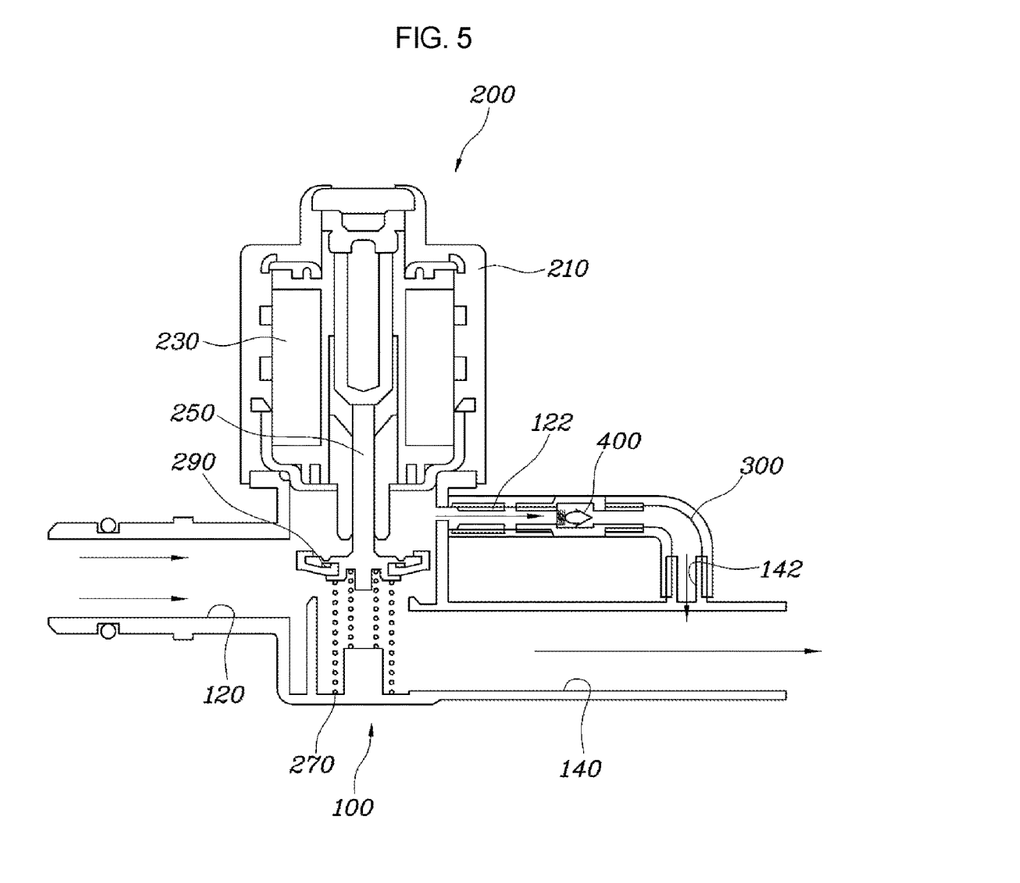
FIG. 5 and FIG. 6 are views showing the state of operation of the canister valve device for a vehicle according to the various exemplary embodiments shown in FIG. 1.
Figure 6:
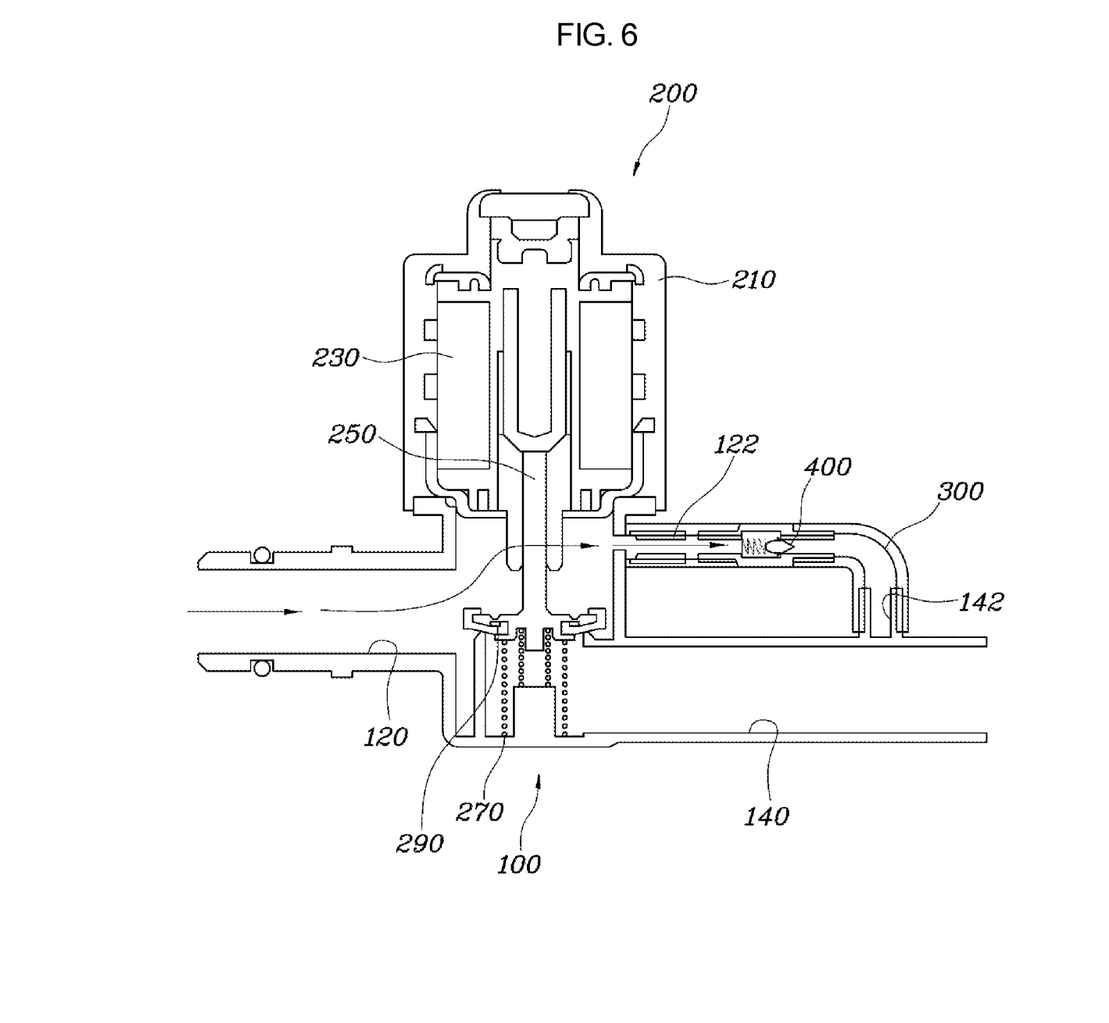

FIG. 1 is a view showing a canister valve device for a vehicle according to various exemplary embodiments of the present invention, FIGS. 2 to 4 are views illustrating the canister valve device for a vehicle according to the various exemplary embodiments shown in FIG. 1, and FIGS. 5 to 6 are views showing the state of operation of the canister valve device for a vehicle according to the various exemplary embodiments shown in FIG. 1.

Figure 7:
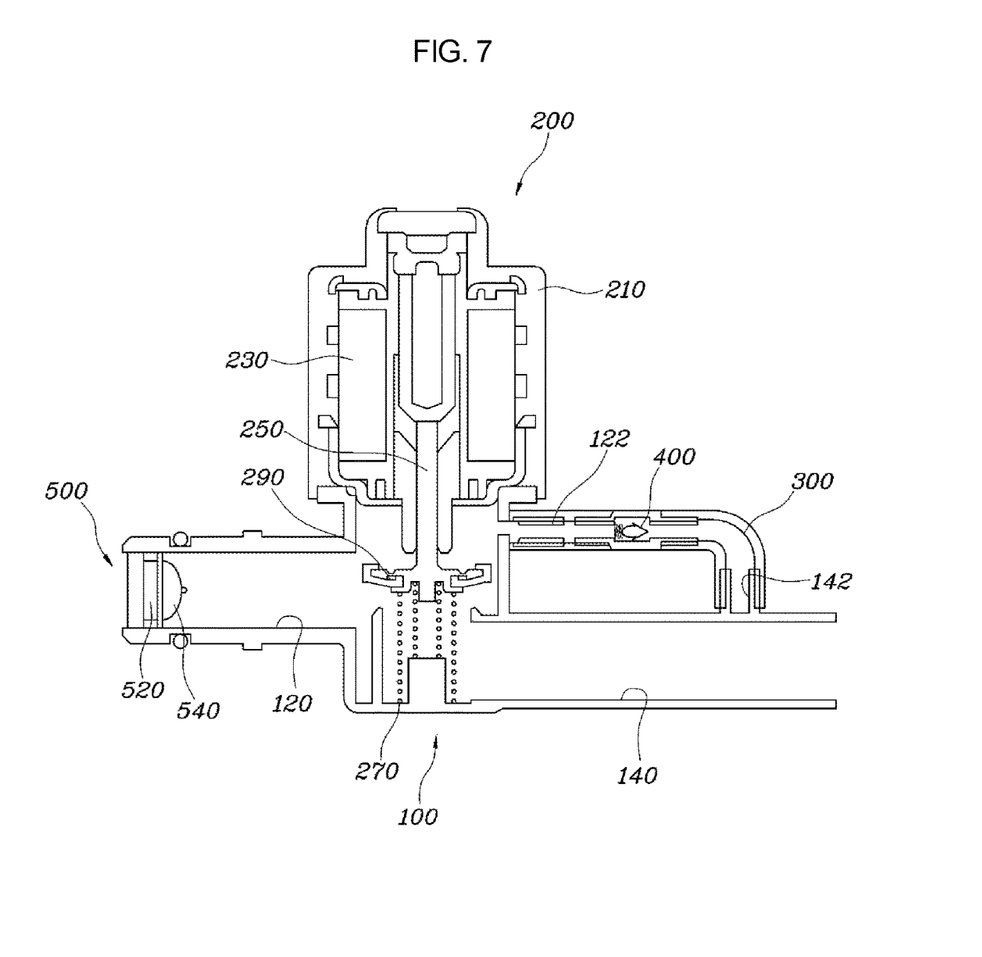
FIG. 7 is a view showing a canister valve device for a vehicle according to various exemplary embodiments of the present invention.

FIG. 7 is a view showing a canister valve device for a vehicle according to various exemplary embodiments of the present invention and FIGS. 8 to 11 are views illustrating the canister valve device for a vehicle according to the various exemplary embodiments shown in FIG. 6.

Figure 12:
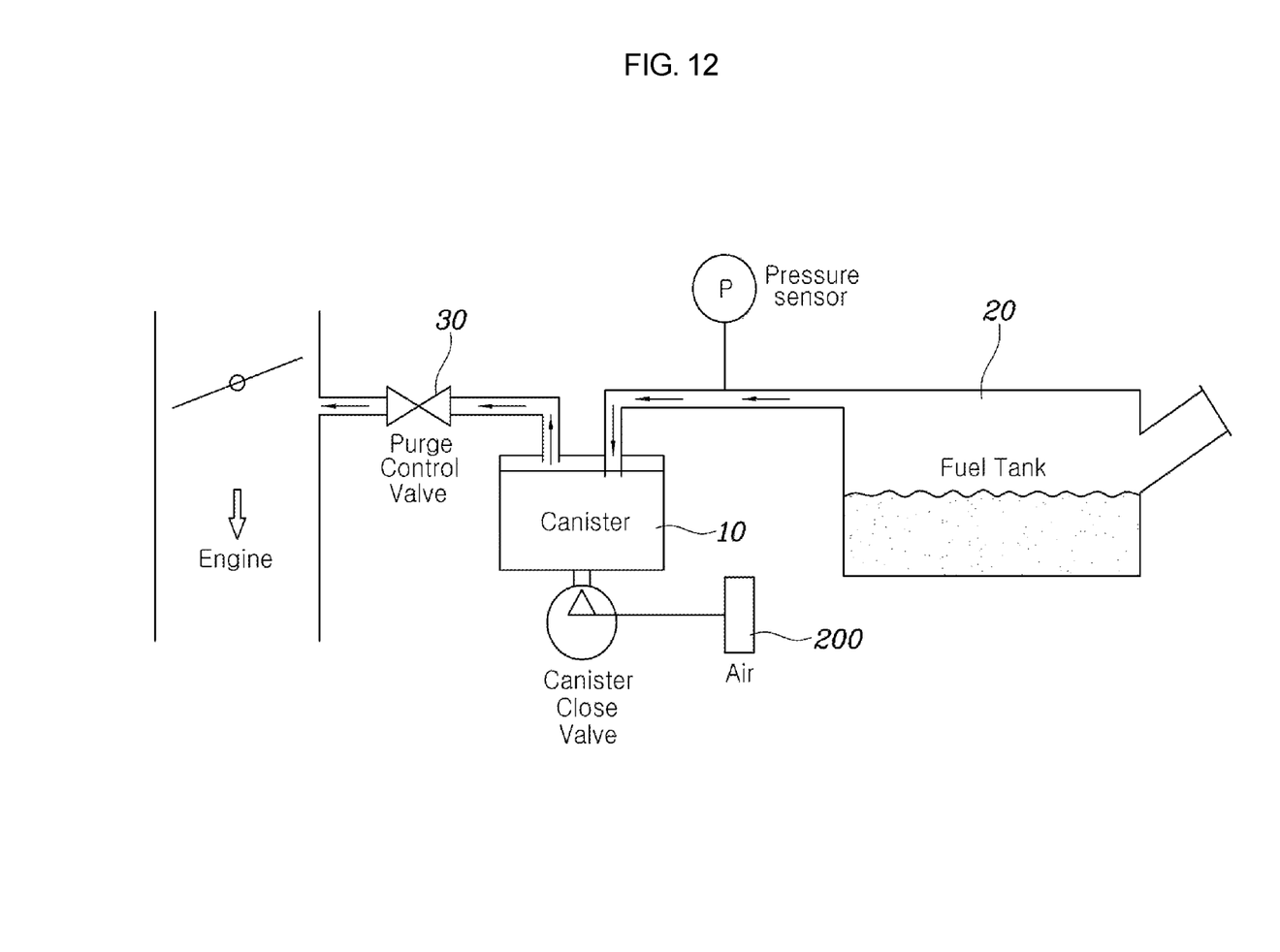
FIG. 12 is a view showing a fuel system applied to an automotive canister.

FIG. 12 is a view showing a fuel system applied to an automotive canister.

A fuel system having a canister 10 is described first with reference to FIG. 12. Hydrocarbon contained in fuel vapor produced in a fuel tank 20 is collected in a canister 10 containing active carbon and the collected hydrocarbon is supplied to an intake pipe through a purge control valve 30 together with air from an outside, depending on the opening/closing of a canister close valve (hereafter, referred to as a shutoff valve device 200).

Various embodiments of the present invention relates to the shutoff valve device 200 selectively allowing air to flow to the canister 10, and, improves airtightness performance and noise reduction performance, and opening performance as well of the shutoff valve device 200 in consideration of that negative pressure by airflow is applied to the shutoff valve device 200.

A canister valve device for the vehicle according to an exemplary embodiment of the present invention is equipped with the shutoff valve device 200 that is connected to a pipe 100 providing a passage for air to flow to the canister 10 and selectively opens or closes the passage of the pipe 100. The canister valve device includes: a diverging channel 300 that diverges from the passage of the pipe 100 to the position where the shutoff valve device 200 is positioned to provide a passage for some of the air flowing to the pipe 100; and a check valve device 400 that is positioned in the diverging channel 300, closes when the shutoff valve device 200 closes, and opens when the shutoff valve device 200 opens so that air is distributed to the pipe 100 and the diverging channel 300, whereby the negative pressure applied to the shutoff valve device 200 is reduced by the flow of the air.

That is, the diverging channel 300 diverges and extends from the pipe 100 in which the shutoff valve device 200 for controlling airflow is positioned. The diverging channel 300 diverges from the position where the shutoff valve device 200 is positioned, so even if the passage of the pipe 100 is closed by the shutoff valve device 200, air can flow through the diverging channel 300. The check valve device 400 is positioned in the diverging channel 300. When the shutoff valve device 200 is closed, all of the air flowing in the pipe 100 flows to the diverging channel 300, so the check valve device 400 is closed. Further, when the shutoff valve device 200 is opened, some of the air flowing in the pipe 100 flows to the diverging channel 300, so the check valve device 400 is opened. Accordingly, when the shutoff valve device 200 is closed, the check valve device 400 is also closed, so air cannot flow to the canister 10. Further, when the shutoff valve device 200 is opened, the check valve device 400 is also opened, so air flows through both the pipe 100 and the diverging channel 300, whereby the negative pressure of the air applied to the shutoff valve device 200 is configured to be reduced. That is, when the shutoff valve device 200 is opened, air flows through the pipe 100 and some of the air flows through the diverging channel 300, so the negative pressure applied to the shutoff valve device 200 is configured to be reduced, improving the opening performance of the shutoff valve device 200.

According to an exemplary embodiment of the present invention, in detail, the pipe 100, as shown in FIGS. 1 to 5, may include a first inlet port 120 through which air flows inside and a second inlet port 140 extending from the first inlet port 120 so that the air flowing inside through the first inlet port 120 flows to the canister 10.

The pipe 100 includes the first inlet port 120 and the second inlet port 140 and, the first inlet port 120 and the second inlet port 140 are connected to each other, so that the air flowing inside can smoothly flow to the canister 10. The diverging channel 300 is connected to the first inlet port 120 and the second inlet port 140 and may diverge along another path from the first inlet port 120 and extend to the second inlet port 140. That is, the diverging channel 300 provides a passage for the air flowing through the first inlet port 120 to flow to the second inlet port 140, regardless of opening/closing of the shutoff valve device 200, and the flow of the air is selectively allowed by the check valve device 400 to be described below. The diverging channel 300 distributes the negative pressure generated by the airflow in the pipe 100 when some of the air flowing through the pipe 100 flows through the diverging channel 300, so the negative pressure in the pipe 100 is distributed to the diverging channel 300 and reduced, and accordingly, the performance of the shutoff valve device 200 is improved.

The second inlet port 140 may be positioned lower than the first inlet port 120 in the airflow direction. That is, the shutoff valve device 200 to be described again below is positioned between the first inlet port 120 and the second inlet port 140. When a shutoff valve 290 of the shutoff valve device 200, which is supposed to move up and down, closes the pipe 100 by moving down, the air flowing in the first inlet port 120 flows to the second inlet port 140, so negative pressure applied to the shutoff valve device 200 is moved down. Accordingly, when the shutoff valve device 200 is closed, it is brought in close contact in the closing direction by the negative pressure applied to the shutoff valve 290, so airtightness is improved and noise is reduced. In contrast, when the shutoff valve device 200 is opened, negative pressure is applied to the shutoff valve 290, so the opening performance may be reduced. In an exemplary embodiment of the present invention, when the shutoff valve device 200 is opened, the check valve device 400 in the diverging channel 300 is also opened, so some of the air flowing through the pipe 100 flows through the diverging channel 300. Accordingly, negative pressure applied to the shutoff valve 290 is reduced and the opening performance of the shutoff valve 290 is improved.

In detail, as shown in FIG. 2, a first nipple 122 may be formed at the first inlet port 120, a second nipple 142 may be formed at the second inlet port 140, and both ends of the diverging channel 300 may be connected to the first nipple 122 and the second nipple 142. As described above, the diverging channel 300 is connected to the first nipple 122 and the second nipple 142 formed at the first inlet port 120 and the second inlet port 140, so the diverging channel 300 can be easily connected to the first inlet port 120 and the second inlet port 140. The first nipple 122 and the second nipple 142 may be formed adjacent to each other at the first inlet port 120 and the second inlet port 140 to reduce the length of the diverging channel 300. Obviously, the diverging channel 300 may be integrally formed with the first inlet port 120 and the second inlet port 140, but the manufacturing process thereof is not easy and, when air leaks from the diverging channel 300 or when the check valve 400 is damaged, it is difficult to replace them. Accordingly, the first nipple 122 and the second nipple 142 are formed respectively at the first inlet port 120 and the second inlet port 140, and the diverging channel 300 is connected to the nipples. The diverging channel 300 connected to the first nipple 122 and the second nipple 142 may be fixed by a specific clip.

Further, as shown in FIG. 3, the diverging channel 300 is divided into a first hose 302 connected to the first nipple 122 and a second hose 304 connected to the second nipple 142, and the first hose 302 and the second hose 304 may be connected through the check valve device 400. Accordingly, when the check valve device 400 breaks down, it is possible to remove the check valve device 400 from the diverging channel 300, and when the diverging channel 300 is damaged, it is possible to easily repair the diverging channel 300 merely by replacing the first hose 302 or the second hose 304, so the manufacturing cost can be reduced. The first nipple 122, the first hose 3032, the check valve device 400, the second hose 304, and the second nipple 142 can all be fixed and hermetically sealed using separate clips.

Further, as shown in FIG. 5, the shutoff valve device 200 may be an electromagnetic solenoid valve that is operated to close the pipe 100 when power is applied, and is operated to open the pipe when power is not applied. The shutoff valve device 200 that is an electromagnetic solenoid valve is operated, depending on whether power is applied under the control of an ECU when a specific operation condition is met, whereby the operation time can be controlled.

The shutoff valve device 200, as shown in FIG. 5, may include: a body 210 coupled to the pipe 100; a plunger 250 vertically moved by an electromagnet 230 in the body 210; and the shutoff valve 290 coupled to an end of the plunger 250 by an elastic spring 270 and closing the passage of the pipe 100 when the plunger 250 is moved. That is, the electromagnet 230 that changes electricity into magnetic energy when power is applied and the plunger 250 that is vertically moved by the magnetic energy are positioned in the body 210 of the shutoff valve device 200. The shutoff valve 290 is coupled to the end of the plunger 250 through the elastic spring 270 to be elastically supported in the pipe 100. Accordingly, when power is applied and the plunger 250 is moved downward, the shutoff valve 290 is moved down and closes the passage of the pipe 100. Further, when power is not applied, the shutoff valve 290 is returned by the elasticity of the elastic spring 270 to open the passage of the pipe 100.

Accordingly, as described above, the negative pressure by air that is applied to the shutoff valve 290 is applied downward in the closing direction with the second inlet port 140 positioned lower than the first inlet port 120 in the airflow direction, whereby waterproofing performance and noise reduction performance can be improved.

As can be seen in FIG. 4, the check valve device 400 may include: a housing 420 positioned in the diverging channel 300 and having an air hole 422 for airflow; a check valve 440 positioned in the housing 420 and moved by airflow to close the air hole 422; and a return spring 460 positioned in the housing 420, connected to the check valve 440, and returning the check valve 400 that has been moved to its initial position.

The housing 410 is open at a first side and a second side thereof to allow air to flow and the air hole 422 is formed in the center portion thereof, so when the check valve 440 in the housing 420 selectively opens and closes the air hole 422, air can be selectively allowed to flow. The check valve 440 has a first end fixed to the housing 420 and a second end connected to the return spring 460 so that the check valve 440 is elastically supported to return to the initial position. Further, as can be seen in FIG. 4, in order for the check valve 440 to be moved by airflow, a flap 442 may be formed at a first end of the check valve 440 to receive the influence of air and the return spring 460 coupled to the check valve 440 is positioned at the upstream side in the airflow direction, so the check valve 440 that has been moved by airflow can be returned in the direction opposite to the airflow. Accordingly, when the shutoff valve device 200 closes the pipe 100, air flows to the diverging channel 300 and the check valve 400 moves and closes the air hole 422 of the housing 420. Further, when the shutoff valve device 200 opens the pipe 100, a large amount of air flow into the pipe 100 and the check valve 440 opens the air hole 422 in the housing 420 such that some of the air flows through the air hole 422.

Figure 8:
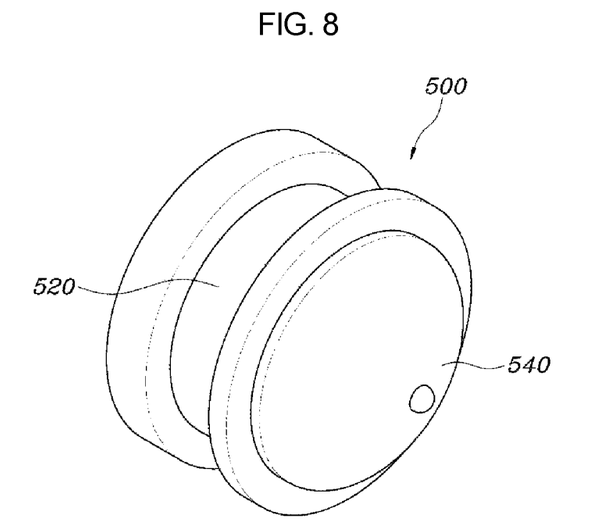
FIG. 8, FIG. 9, FIG. 10, and FIG. 11 are views illustrating the canister valve device for a vehicle according to the various exemplary embodiments shown in FIG. 6.

On the other hand, various exemplary embodiments of the present invention, as shown in FIGS. 7 and 8, may further include an air control valve device 500 that selectively allows airflow ahead of the shutoff valve device 200 in the pipe 100.

That is, the air control valve device 500 is positioned at the inlet through which air flows into the pipe 100. When the shutoff valve device 200 opens and negative pressure is generated, the air control valve device 500 opens and allows air to flow. Further, when the shutoff valve device 200 closes and the negative pressure is reduced, the air control valve device 500 closes and limits the airflow, whereby the inside of the pipe 100 is tightly shut.

Figure 9:
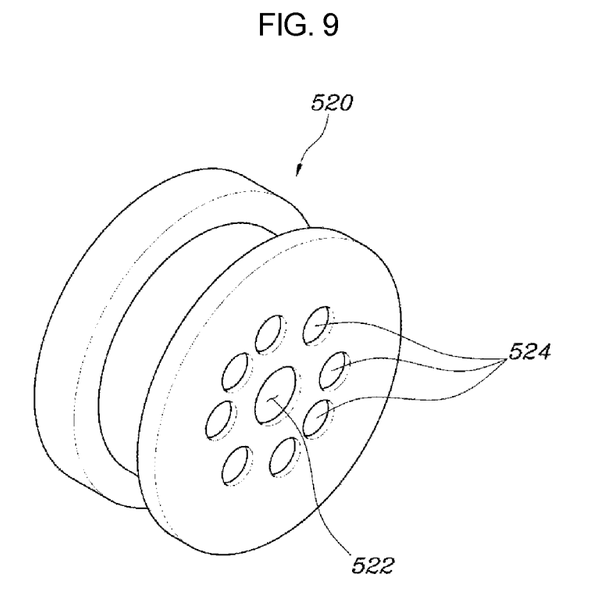
Figure 10:
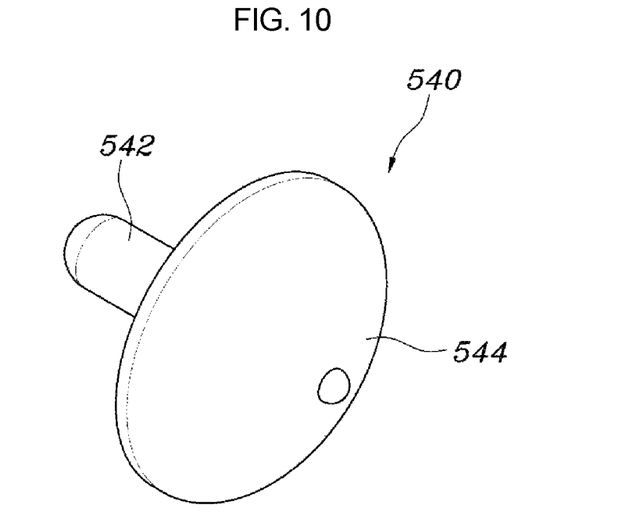
Figure 11:
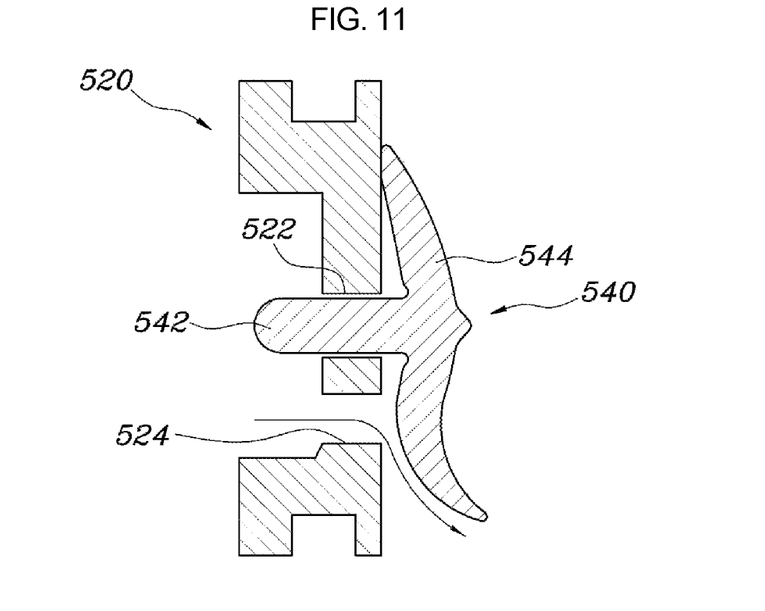

The air control valve device 500, as shown in FIGS. 8 to 10, may include: a body 520 coupled to the pipe 100 and having a coupling hole 522 in the center and a plurality of airflow holes 524 around the coupling hole 522; and a control valve 540 having a coupling shaft 542 inserted and fixed in the coupling hole 522 in the body 520 and a flange 544 extending around the coupling shaft 542 and covering the airflow holes 524.

That is, the air control valve device 500 includes the body 520 fixed to the pipe 100 and the control valve 540 the shape of which is changed by airflow. The coupling hole 522 is formed in a center of the body 520 and the control valve 540 is coupled to the body 520 by fitting the coupling shaft 542 of the control valve 540 into the coupling hole 522. The flange 544 of the control valve 540 is changed in shape by the air flowing through the airflow holes 524 in the body 520.

The control valve 540 includes a flexible material to be variable in shape by airflow and the flange 544 of the control valve 540 is rounded toward the body 520 around the coupling shaft 542. Accordingly, as can be seen from FIG. 11, when air flows through the airflow holes 524 in the body 520, the control valve 540 is transformed in the airflow direction, allowing air to flow. Further, since the flange 544 is formed in a rounded umbrella shape, it comes in close contact with the body 520 in the closing operation, so airtightness can be maintained.

As described above, according to an exemplary embodiment of the present invention, when the shutoff valve device 200 is closed, the operation direction and the direction of the negative pressure attributable to airflow are the same. Further, the shutoff valve 290 of the shutoff valve device 200 hermetically closes the pipe 100 and noise is minimized. Further, when the shutoff valve device 200 opens, the diverging channel 300 also opens and flowing air is distributed to the pipe 100 and the diverging channel 300, so that the negative pressure applied to the shutoff valve 290 is reduced, and accordingly, the opening performance of the shutoff valve 290 is improved. Therefore, according to the canister valve device for a vehicle of the present invention, the airtightness performance and noise reduction performance of a valve are ensured and negative pressure applied to the valve is reduced by distributing the negative pressure when the valve opens, so the opening performance of the valve is improved. Accordingly, the durability of a fuel system can be ensured.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A canister valve device for a vehicle that is equipped with a shutoff valve device connected to a pipe providing a passage for air to flow to a canister and selectively opening and closing the passage of the pipe, the canister valve device comprising:
   a diverging channel diverging from the passage of the pipe to a position where the shutoff valve device is positioned to provide a passage for a portion of air flowing to the pipe;
   a check valve device positioned in the diverging channel, closing when the shutoff valve device closes, and opening when the shutoff valve device opens so that air is distributed to the pipe and the diverging channel, whereby negative pressure applied to the shutoff valve device is configured to be reduced by flow of the air; and
   an air control valve device selectively allowing airflow ahead of the shutoff valve device in the pipe,
   wherein the air control valve device includes:
      a body coupled to the pipe and having a coupling hole in a center thereof and a plurality of airflow holes around the coupling hole; and
      a control valve having a coupling shaft inserted and fixed in the coupling hole in the body and a flange extending around the coupling shaft and covering the airflow holes.

2. The canister valve device of claim 1, wherein the pipe includes:
   a first inlet port through which air flows inside; and
   a second inlet port extending from the first inlet port so that the air flowing inside through the first inlet port flows to the canister, and
   the diverging channel diverging along a path from the first inlet port and extending to the second inlet port.

3. The canister valve device of claim 2, wherein the second inlet port is positioned lower than the first inlet port in an airflow direction.

4. The canister valve device of claim 2, wherein a first nipple is formed at the first inlet port, a second nipple is formed at the second inlet port, and first and second ends of the diverging channel are connected to the first nipple and the second nipple, respectively.

5. The canister valve device of claim 4, wherein the diverging channel is divided into a first hose connected to the first nipple and a second hose connected to the second nipple, and the first hose and the second hose are connected to each other through the check valve device.

6. The canister valve device of claim 1, wherein the shutoff valve device is an electromagnetic solenoid valve that is configured to be operated to close the pipe when power is applied, and is configured to be operated to open the pipe when power is not applied.

7. The canister valve device of claim 6, wherein the shutoff valve device includes:
   a body coupled to the pipe;
   a plunger vertically moved by an electromagnet in the body; and
   a shutoff valve coupled to an end of the plunger through an elastic spring and closing the passage of the pipe when the plunger is moved.

8. The canister valve device of claim 1, wherein the check valve device includes:
   a housing positioned in the diverging channel and having an air hole for airflow;
   a check valve positioned in the housing and moved by the airflow to close the air hole; and
   a return spring positioned in the housing, connected to the check valve, and returning the check valve that has been moved to an initial position thereof.

9. The canister valve device of claim 1, wherein the control valve includes a flexible material to be variable in shape by airflow.

10. The canister valve device of claim 1, wherein the flange of the control valve is rounded toward the body around the coupling shaft.

* * * * *